(12) United States Patent
Shao

(10) Patent No.: US 7,819,475 B2
(45) Date of Patent: Oct. 26, 2010

(54) SLIDING LATCHING SYSTEM

(75) Inventor: Yi Shao, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 556 days.

(21) Appl. No.: 11/659,302

(22) PCT Filed: Aug. 4, 2005

(86) PCT No.: PCT/US2005/027678

§ 371 (c)(1),
(2), (4) Date: Feb. 2, 2007

(87) PCT Pub. No.: WO2006/017633

PCT Pub. Date: Feb. 16, 2006

(65) Prior Publication Data

US 2009/0021064 A1  Jan. 22, 2009

Related U.S. Application Data

(60) Provisional application No. 60/598,982, filed on Aug. 5, 2004.

(51) Int. Cl.
*A47C 1/00* (2006.01)
*B60N 2/02* (2006.01)

(52) U.S. Cl. .............................. 297/344.11; 297/344.1

(58) Field of Classification Search ............ 297/344.1, 297/344.11, 326, 336, 463.1, 440.1; 296/65.11, 296/65.03, 65.01; 248/429, 424
See application file for complete search history.

(56) References Cited

U.S. PATENT DOCUMENTS 2,753,947 A * 7/1956 Mach ................ 180/89.18
5,730,480 A * 3/1998 Takamura ............. 248/503.1
5,997,069 A * 12/1999 Coffey et al. ............ 296/65.03
6,648,393 B1 * 11/2003 Milnar et al. ........... 296/65.11
2003/0047977 A1   3/2003 Lejeune et al.
2006/0220411 A1 * 10/2006 Pathak et al. ........... 296/65.11

FOREIGN PATENT DOCUMENTS

| EP | 1 103 410 A2 | 5/2001 |
| EP | 1 176 047 A1 | 1/2002 |
| FR | 2 779 688 A1 | 12/1999 |
| WO | WO 01/89873 A1 | 11/2001 |
| WO | WO 03/004304 A1 | 1/2003 |

OTHER PUBLICATIONS

International Search Report for PCT/US2005/027678, date of mailing. Nov. 3, 2005, 3 pages.

* cited by examiner

*Primary Examiner*—Milton Nelson, Jr.
(74) *Attorney, Agent, or Firm*—Foley & Lardner LLP

(57) ABSTRACT

A system for latching a seat to a guide track (102) is disclosed. The system generally includes a latch plate (122) being coupled to the seat, a first release member (124) coupled to the latch plate (122), and a second release member coupled to the latch plate. The first release member (124) is configured to releasably engage the guide track (102) and is selectively movable between a first position for fixedly coupling the seat to the guide track (102), a second position for movably coupling the seat to the guide track, and a third position for detachably coupling the seat to the guide track (102). A second release member (160) is configured to prevent the first release member (124) for moving to the third position unless the second release member has been selectively actuated.

20 Claims, 10 Drawing Sheets

SLIDING LATCHING SYSTEM

CROSS-REFERENCE TO RELATED PATENT APPLICATIONS

This application claims the benefit under 35 U.S.C. 119(e) of U.S. Provisional Application 60/598,982, having a filing date of Aug. 5, 2004, titled "SLIDING LATCHING SYSTEM," the disclosure of which is hereby incorporated by reference.

BACKGROUND

The invention relates generally to seating technology. More specifically, the invention relates to latch systems which allow for a seat assembly to be selectively repositioned and/or reconfigured within a vehicle.

Vehicle manufacturers are continually striving to provide improved convenience features in motor vehicles, including features relating to seating technology. In continuing with this trend, many vehicles such as sport utility vehicles and minivans are provided with sophisticated second and/or third row seat assemblies configured to move between a use position and a non-seating position (e.g., a non-use position, a stowed position, etc.), and/or that may be removable from the vehicle. Such flexibility in a seating system is generally intended to permit the cargo carrying capacity of the vehicle to be increased.

While the current trend is to focus on stowing and/or removing seat assemblies relative to the vehicle structure, it may be advantageous to provide a seating system that can allow a seat assembly to be selectively positioned within the vehicle in addition to being capable of being stowed and/or removed. For example, if multiple seat assemblies are provided in vehicle, and certain seat assemblies are stowed and/or removed to increase the cargo carrying capacity of the vehicle, it may be desirable to reposition any remaining seat assemblies to more convenient locations. The repositioning of a seat assembly would be greatly simplified if the seat assembly could remain engaged with the vehicle as it is being moved to a new position. Repositioning would further be simplified if the seat assembly could be moved while supporting a seat occupant.

Accordingly, there is a need for a latch system that can allow a seat assembly to be selectively repositioned in a vehicle while remaining engaged with the vehicle structure. There is also a need for a latch system that can reduce the likelihood that a seat assembly will disengage the vehicle structure as the seat assembly is being selectively repositioned. There is also a need for a latch system that can provide for the lateral movement of seat assembly relative to the vehicle structure. There is also a need for a latch system that includes a feature that is intended to prevent a seat assembly from being removed from the vehicle until the seat assembly is moved into a non-seating position. There is also a need for a seating system having a latch system that accomplishes one or more of the above-mentioned needs.

It would be desirable to provide a latch system and/or a seating system that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment of the present invention relates to a latch system for use with a seat to be latched to a guide track. The system includes a latch plate capable of being coupled to the seat, a first release member coupled to the latch plate, and a second release member coupled to the latch plate. The first release member has a base portion and a projection configured to releasably engage the guide track. The projection is selectively movable between a first position for fixedly coupling the seat to the guide track, a second position for movably coupling the seat to the guide track, and a third position for detachably coupling the seat to the guide track. The second release member has a pawl configured to prevent the projection from moving to the third position unless the second release member has been selectively actuated.

Another exemplary embodiment of the present invention relates to a seating system for use within a vehicle having a floor structure. The seating system includes a seat having a seat bottom and a backrest, a guide track configured to be coupled to the floor structure, a first latch plate coupled to the seat, a first release member coupled to the first latch plate, and a second release member coupled to the latch plate. The first release member is configured to releasably engage the guide track. The first release member is selectively movable between a first position for fixedly coupling the seat to the guide track, a second position for movably coupling the seat to the guide track, and a third position for detachably coupling the seat to the guide track. The second release member is configured to engage the first release member for preventing the first release member from moving to the third position unless the seat is in a non-seating position.

Another exemplary embodiment of the present invention relates to a method of latching a seat to a guide track within a vehicle. The method includes the steps of providing a latch plate coupled to the seat, providing a first release member coupled to the latch plate, and providing a second release member coupled to the latch plate. The first release member is configured to releasably engage the guide track and move between a first position for fixedly coupling the seat to the guide track, a second position for movably coupling the seat to the guide track, and a third position for detachably coupling the seat to the guide track. The second release member is configured to prevent the first release member from moving to the third position unless the seat is in a non-seating position.

Another exemplary embodiment of the present invention relates to a seating system for movably coupling a seat assembly to a vehicle structure includes a seat assembly and a latching system. The seat assembly includes a seat back supported for pivotal movement relative to a seat bottom between a use position and a stowed position. The latching system includes a rail member adapted to be supported by the vehicle structure. The rail member includes at least one aperture for securing the seating system in place. In one embodiment, the rail member includes a plurality of apertures so that the seat assembly can be secured in more than one position along the rail member. The latching system further includes a first release configured to releasably engage the rail member and move between a locking position, a sliding position, and a release position. In the locking position, the first release engages the aperture provided in the rail member to secure the seat assembly to the vehicle structure. In the sliding position, the first release disengages the aperture and engages a portion of the rail member that allows the seat assembly to slide along the rail member without disengaging. In the release position, the first release sufficiently disengages the rail member to allow the seat assembly to be removed from the rail member. The latching system further includes a second release having a lever and a pawl. The second release prevents the first release from moving into the release position until the seat back is move to the stowed position thereby actuating the lever and moving the pawl.

Another exemplary embodiment of the present invention relates to a latching system for a vehicle with a seat assembly and a track member for selectively positioning the seat assembly throughout the vehicle includes an inboard side latch and an outboard side latch. The inboard side latch and the outboard side latch both include a first release that releasably engages the track. The latching system further includes a sliding unit supported relative to the inboard side latch and the outboard side latch, a user interface coupled to at least one of the inboard side latch and the outboard side latch, and a towel bar operably coupling the inboard side latch and the outboard side latch. Actuation of the user interface causes the first release to move between a locking position and a sliding position. In the locking position, the first release engages an aperture in the track. In the sliding position, the first release is disengaged from the aperture and engages a lip on the track.

Another exemplary embodiment of the present invention relates to a lateral sliding latching system for a vehicle having a vehicle seat with a seat back movable between an upright use position and a folded or stowed position includes a first and second rail extending laterally across the vehicle. The first rail is supported near a front portion of the vehicle seat and the second rail is supported near a rear portion of the vehicle seat. The latching system further includes a first pair of inboard and outboard mounting structures for engaging the first rail, and a second pair of inboard and outboard mounting structures for engaging the second rail. A first release is movably coupled to each mounting structure and configured to releasably engage the respective rail. A second release is coupled to at least one inboard mounting structure and configured to releasably engage the respective first release. A user interface is coupled to at least one outboard mounting structure and is coupled to the respective first release. A pair of towel bars are provided to couple the inboard mounting structures to the outboard mounting structures. A pair of sliding units are supported between the inboard mounting structures and the outboard mounting structures. Rotation of the user interface releases the first releases from the respective first and second rails and enables the vehicle seat to laterally move along the rails on the sliding units. The movement of the seat back to the stowed position releases the second release and enables the vehicle seat to be removed from the rails by actuating the towel bar.

Another exemplary embodiment of the present invention relates to a system for latching a seat to a rail member. The system includes a first release having a hook portion configured to removable engage an aperture in the rail member and an interface portion configured to translate the rotational movement of a user interface into a linear movement for engaging and disengaging the hook portion from the rail. The interface portion may be a rack having teeth configured to mesh with the teeth of a pinion operably coupled to the user interface. The first release is biased into an engaged position with the rail by a spring. A second release includes a pawl configured to engage the teeth of the pinion operably coupled to the user interface to prevent the hook portion from unintentionally disengaging the rail member.

DETAILED DESCRIPTION

Figure 1:
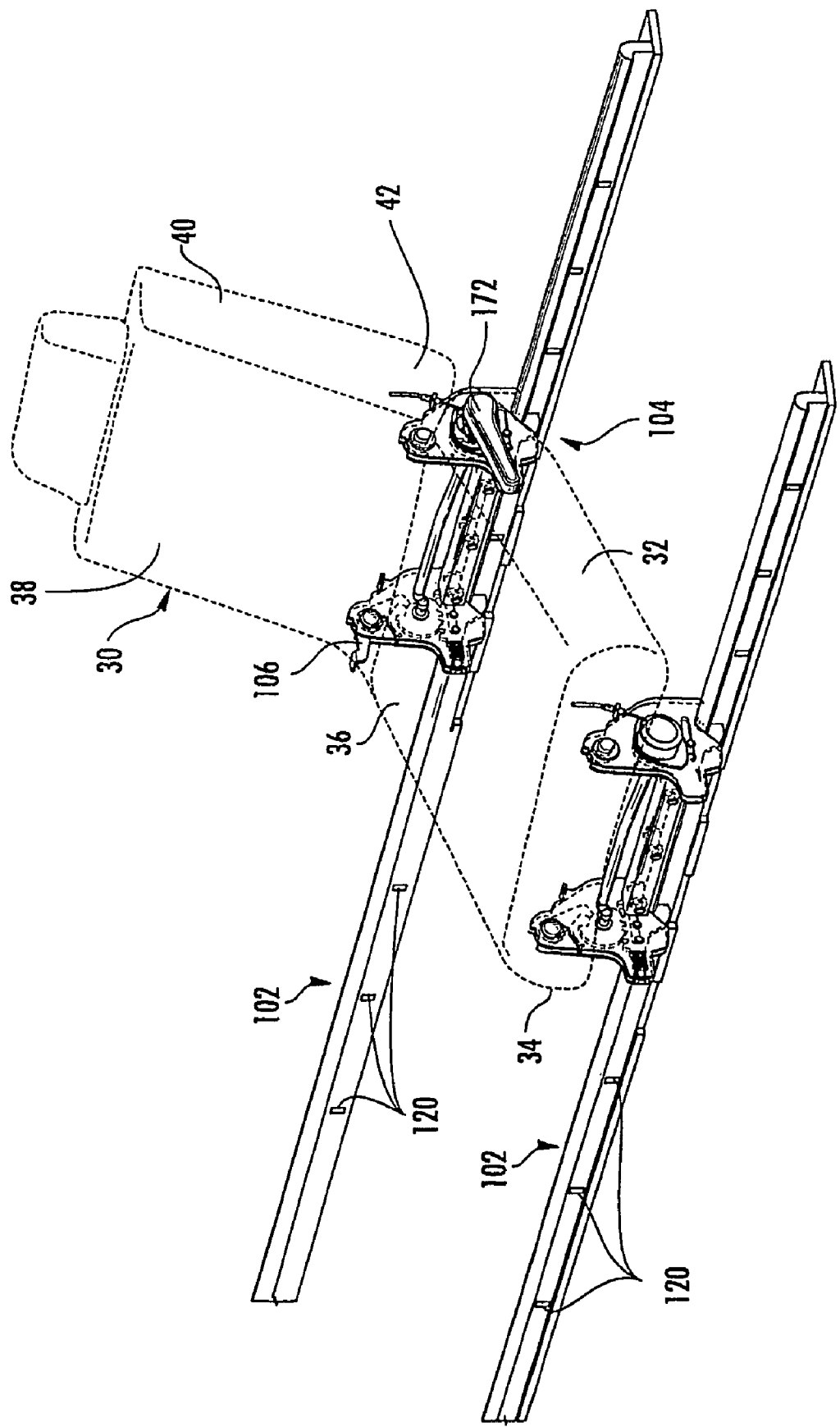
FIG. 1 is a perspective view of a seating system according to an exemplary embodiment.

Before proceeding with the description of a number of exemplary embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for purpose of description and should not be regarded as limiting.

Referring generally to the FIGURES, a latch system 100 couples a seat assembly 30 to a support structure (not shown), such as a vehicle floor, in a manner that enables seat assembly 30 to be selectively movable relative to the support structure such as between alternative seating locations. Latch system 100 also allows for seat assembly 30 to be selectively removable from the support structure and/or stowable relative to the support structure. Latch system 100 may be configured to be actuated by a user between a first or locking position, a second or sliding position, and a third or release position. In the locking position, latch system 100 is intended to securely couple seat assembly 30 to the support structure. In the sliding position, latch system 100 allows seat assembly 30 to be selectively positioned along a track or rail 102 that is mounted to the support structure while reducing the likelihood that seat assembly 30 will disengage rail 102. In the release position, latch system 100 is configured to allow seat assembly 30 to be selectively removed from the support structure entirely and/ or to be moved (e.g., tumbled, folded, flipped, etc.) from a use (e.g., seating) position to a non-seating position (e.g., non-use position, stowed position, etc.).

Latch system 100 may be employed in a variety of applications, and is generally applicable with any seating application for which flexibility in the placement of a seat assembly would be beneficial. In one application, latch system 100 is configured for use with a motor vehicle having second row seating (e.g., sport utility vehicles (SUVs), minivans, vans, trucks, etc.) to provide for the lateral movement (i.e., side-to-side, transverse, etc.) of a seat assembly. For such an application, latch system 100 may be used to movably secure the second row seat assembly to the vehicle structure. While the disclosed embodiments may be described as a latch system for use with a motor vehicle, the features of the disclosed embodiments are equally applicable with other seating applications such as boats, campers, recreational vehicles, airplanes, trains, or any other seating application wherein flexibility in the placement of a seat assembly would be desirable.

FIG. 1 is a perspective view of the seating system 20 which generally includes seat assembly 30 and latch system 100. According to an exemplary embodiment, seating system 20 is coupled to a vehicle structure (not shown). For purposes of this disclosure, the term "coupled" means the joining or combining of two members directly or indirectly to one another. Such joining or combining may be stationary in nature or movable in nature. Such joining may be achieved with the two members or the two members and any additional intermediate members being integrally formed as a single unitary body with one another or with the two members or the two members and any additional intermediate member being attached to one another. Such joining or combining may be permanent in nature or alternatively may be removable or releasable in nature. According to a preferred embodiment, the vehicle structure is the vehicle floor, but alternatively may be the vehicle side wall or any other suitable structure.

Seat assembly 30 generally includes a seat bottom 32 and a backrest or seat back 38. Seat bottom 32 has a front end 34 and a rear end 36. Seat back 38 has an upper end 40 and a lower end 42 that extends upwardly relative to rear end 36 of seat bottom 32. Seat bottom 32 and seat back 38 typically have a seat structure that includes a seat frame (not shown) that is at least partially covered by a cushioned or padded material and/or any other appropriate cover material.

Lower end 42 of seat back 38 is movably coupled at rear end 36 of seat bottom 32 in a manner that enables the pivotal movement of seat back 38 between a use position, wherein seat back 38 is generally upright relative to seat bottom 32, and a non-seating position, wherein seat back is moved forward (e.g., collapsed, folded, rotated, etc.) towards seat bottom 32. Seat assembly 30 may optionally include a recliner mechanism (not shown) that allows a user to selectively align the angle of seat back 38 when in the use position. In one embodiment, seat assembly 30 is configured as the type of seat commonly referred to as a "captain's chair," which is often used as a second row seat in multi-passenger vehicles. As can be appreciated, seat assembly 30 may be any of a variety of seat-types (e.g., bench, split bench, bucket, etc.).

Still referring to FIG. 1, latch system 100 generally includes one or more elongated guide tracks (e.g., mounting members, guides, runners, tracks, etc.) shown a rail member 102, one or more first or outboard latch plates (e.g., support structure, support plate, base, etc.) shown schematically as outboard mounting structure 104, one or more second or inboard latch plates, shown schematically as mounting structure 106, and one or more rail followers (e.g., slider, carriage, bracket, cover, etc.) shown as a sliding unit 108.

Rail member 102 can be coupled to a vehicle structure and defines the direction in which seat assembly 30 can be moved relative to the vehicle structure. Any number of rail members may be used, and according to a preferred embodiment, a pair of rail members 102 are employed. In such a configuration, a first rail member may be positioned near a first edge of seat bottom 32, and a second rail member may be positioned near a second opposite edge of seat bottom 32. According to a preferred embodiment, rail members 102 extend in a direction that is substantially lateral or transverse to a longitudinal axis of a vehicle with a first rail member 102 positioned near front end 34 of seat bottom 32 and a second rail member 102 positioned near rear end 36 of seat bottom 32. In this manner, rail members 102 provide for the lateral movement (i.e., side-to-side, etc.) of seat assembly 30 relative to the vehicle. Rail member 102 may span substantially the entire width of a vehicle, or alternatively may span only a portion of the vehicle. As can be appreciated, in various alternative embodiments, rail member 102 may be aligned at any orientation relative to a vehicle structure to provide movement in any of a variety of directions.

Figure 2:
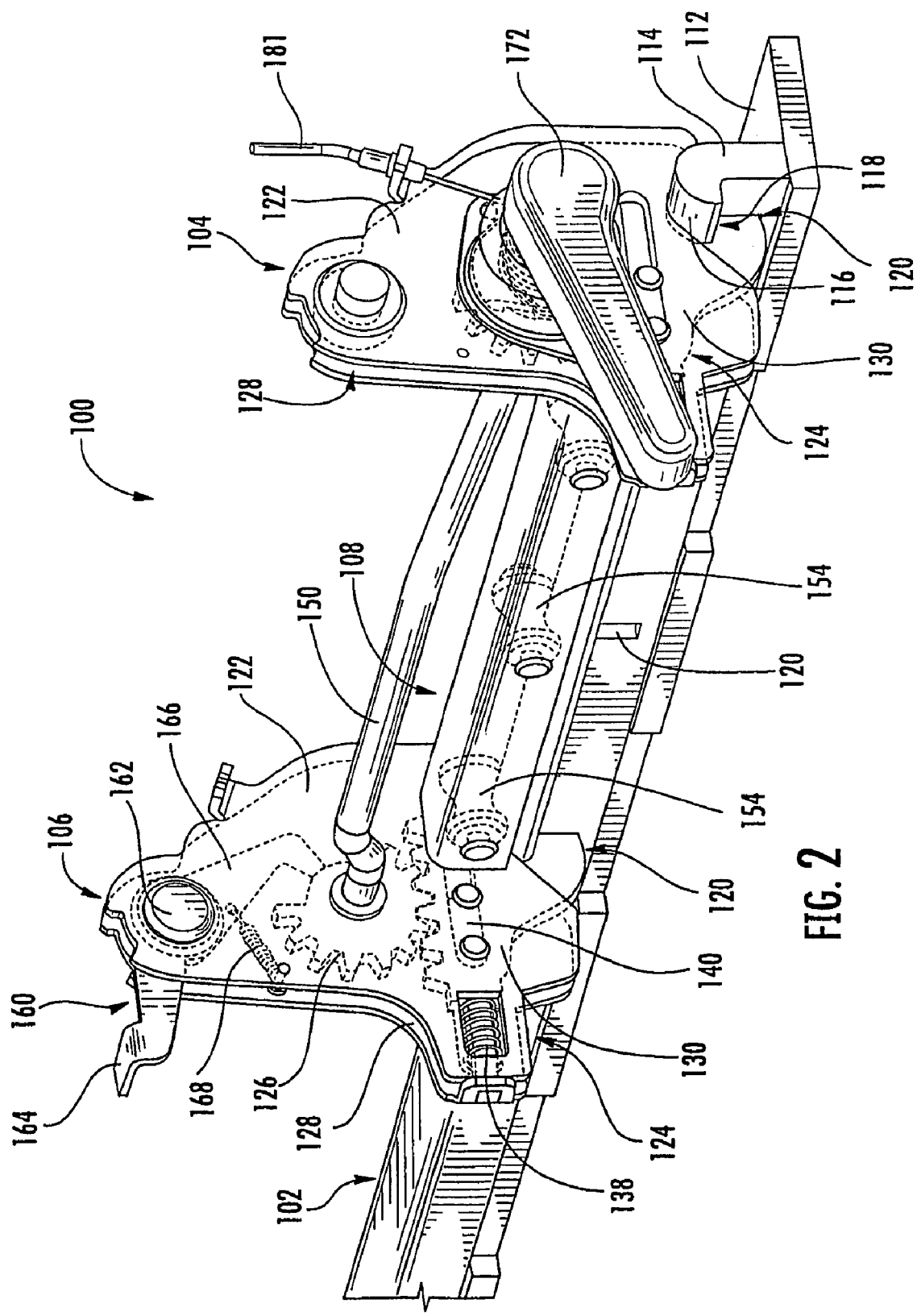
FIG. 2 is a perspective view of a latch system of FIG. 1 according to an exemplary embodiment.

Referring to FIG. 2, rail member 102 generally includes a base portion 112 (e.g., flange, mounting portion, bracket, etc.) and a projection 114. Base portion 112 provides a structure for coupling rail member 102 to a vehicle structure. According to an exemplary embodiment, fasteners (not shown) such as bolts, screws, clips, pins, and the like are used to couple base portion 112 to a vehicle structure. In another embodiment, base portion 112 is welded to a vehicle structure using any appropriate welding process (e.g., resistance spot welding, gas metal arc welding, laser welding, etc.). Alternatively, rail member 102 may be integrally formed with a vehicle structure, or coupled using any other suitable technique.

Projection 114 of rail member 102 extends outward from base portion 112, and includes an interface surface 116 and a lip 118. Interface surface 116 and lip 118 may be located at a distal end of projection 114 as shown, or alternatively may be located at an intermediate position along projection 114. Interface surface 116 of rail member 102 is configured to slidably receive a corresponding portion of sliding unit 108. According to the particular embodiment illustrated, interface surface 116 is a curvilinear surface (shown schematically as a rounded surface) that defines the top portion of projection 114 and partially defines lip 118. According to various alternative embodiments, interface surface 116 may be comprised of a section with liner edges to form triangular, rectangular, or other polygonal shape, or may be configured in a variety of shapes combining both linear and nonlinear edges.

Lip 118 of rail member 102 provides a structure that is intended to prevent seat assembly 30 from disengaging from rail member 102 as the seat assembly is being moved along rail member 102. According to the particular embodiment illustrated, lip 118 includes a linear surface extending substantially perpendicular to projection 114. Alternatively, lip 118 may include a curvilinear surface or may combine both linear and nonlinear surfaces. According to a further alternative embodiment, lip 118 may be formed by removing a portion of projection 114 between its distal end and base portion 112.

Figure 3:
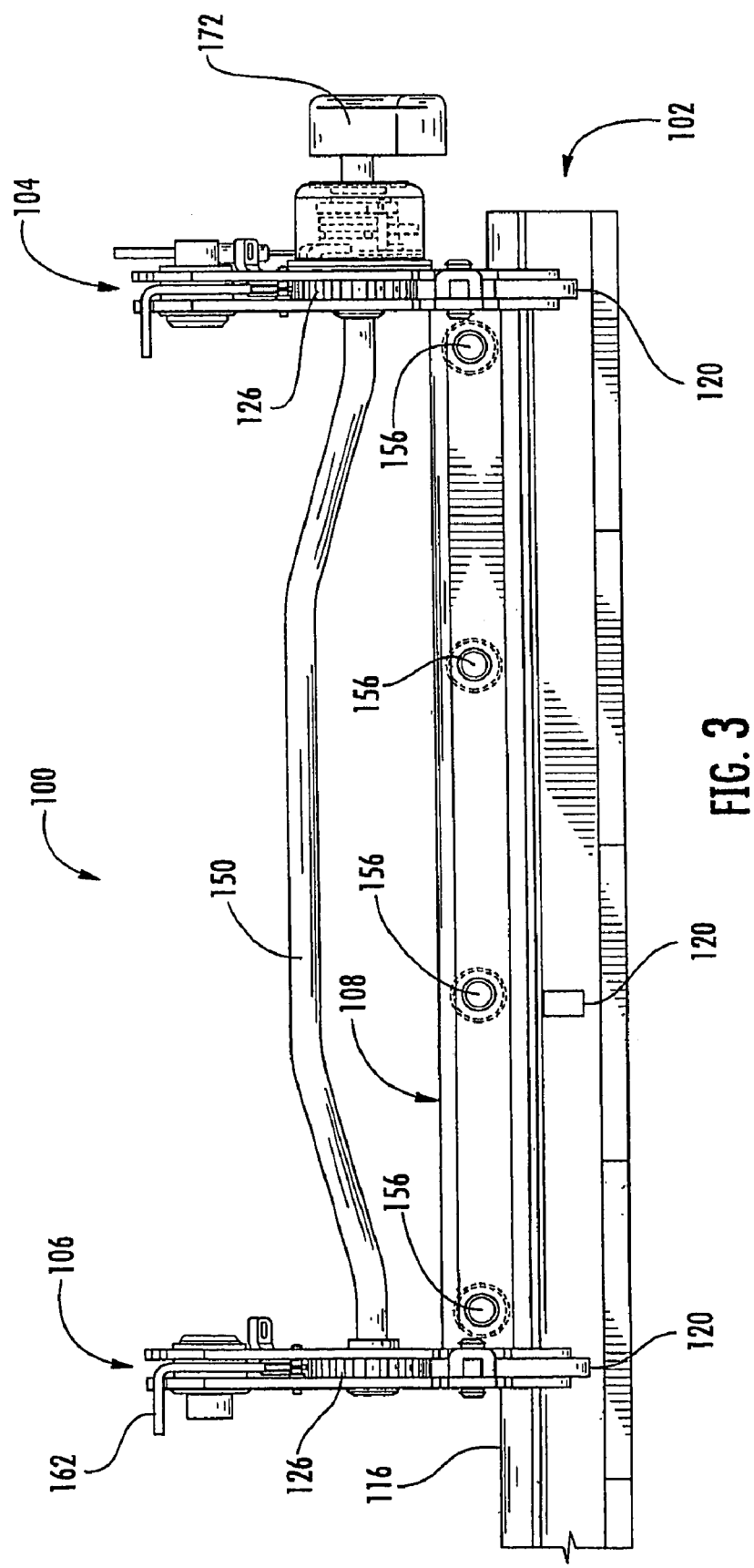
FIG. 3 is a front plan view of the latch system of FIG. 2.

Referring to FIG. 3, rail member 102 further includes a plurality of spaced apart apertures (e.g., recesses, openings, cavities, grooves, windows, etc.) shown as slots 120 that are configured to receive a portion of mounting structures 104, 106. According to the particular embodiment illustrated, slots 120 are substantially rectangular in shape and extend through projection 114 between the distal end and base portion 112. The location of slots 120 along rail member 102 dictate the different use positions that a user may lock seat assembly 30 to the rail member. Preferably, a sufficient number of slots 120 are provided in rail member 102 so that seat assembly 30 can be locked into more than one use position.

Outboard mounting structure 104 and inboard mounting structure 106 couple seat assembly 30 to rail member 102. The mounting structures 104, 106 may be actuated by a user between the locking position (shown in FIG. 1 through 5), the sliding position (shown in FIG. 6), and the release position (shown in FIG. 7). According to a preferred embodiment, seating system 10 includes a first pair of outboard and inboard mounting structures for coupling seat assembly 30 to the first or front rail member 102, and a second pair of outboard and inboard mounting structures for coupling seat assembly 30 to the second or rear rail member 102.

For ease of discussion, only the configuration of the mounting structures 104, 106 coupling seat assembly 30 to the rear rail member 102 are described in detail in this disclosure. It should be noted that the mounting structures coupling the seat assembly to the front rail member are of a similar configuration, unless otherwise noted herein.

Outboard mounting structure 104 and inboard mounting structure 106 are coupled to the seat structure of seat bottom 32 using any of a variety of conventionally known, or otherwise suitable, attachment techniques (e.g., mechanical fasteners (e.g., bolts, screws, pins, clips, etc.), suitable welding processes, etc.). Alternatively, the mounting structures may be integrally formed with the seat structure. According to a further alternative embodiment, the mounting structures may be coupled to others portions of the seating system, such as the lower end of the seat back or a recliner mechanism of the seating system.

Referring further to FIG. 2, outboard and inboard mounting structures 104, 106 both generally include a latch plate 122, a first release 124, and a drive pinion 126. Latch plate 122 couples latch system 100 to the seat structure and supports first release 124 and drive pinion 126. According to the particular embodiment illustrated, latch plate 122 includes two spaced apart sidewalls that are arranged in a manner that provides a gap 128 in latch plate 122.

Figure 5:
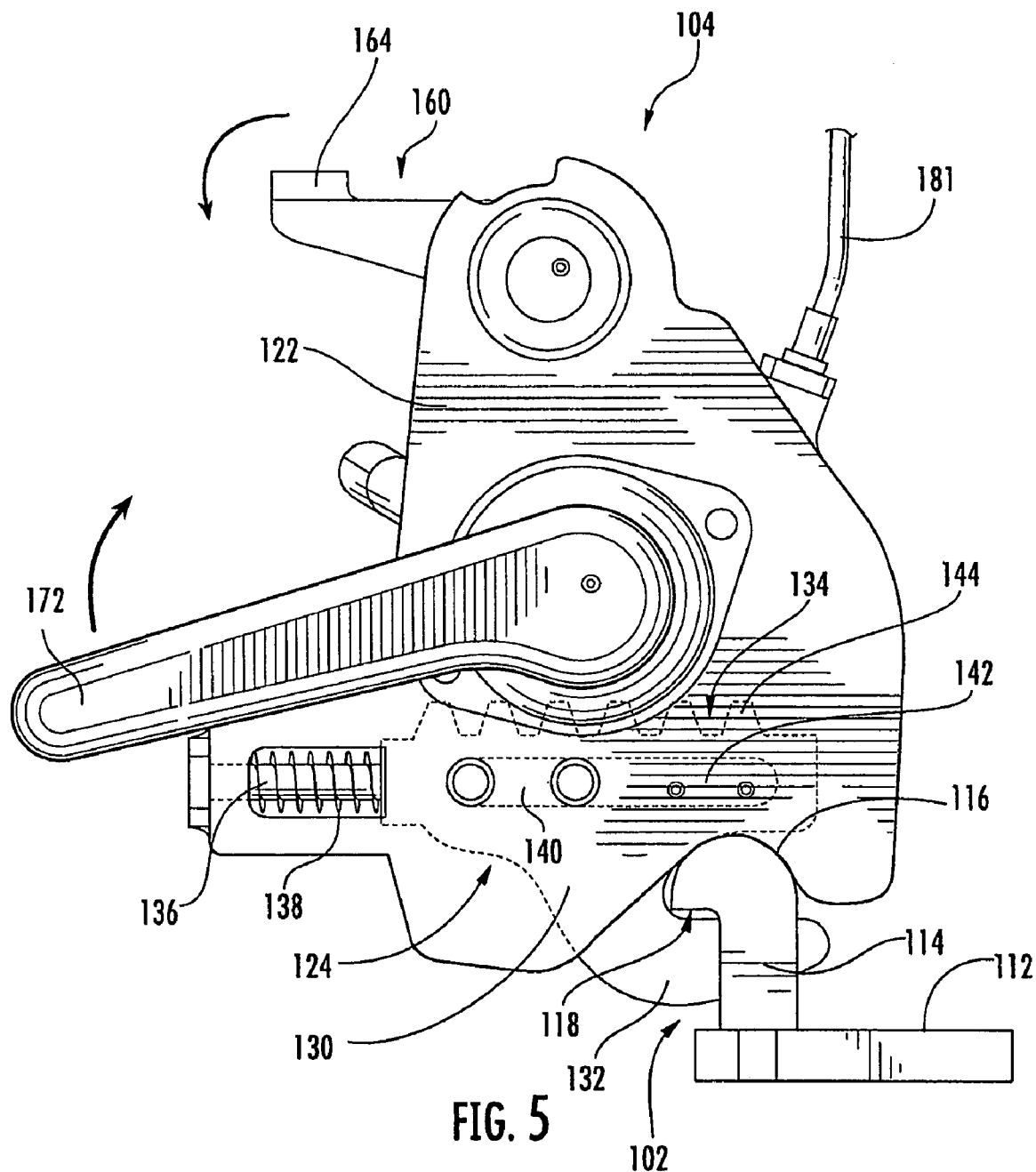
FIG. 5 is a side plan view of the latch system of FIG. 2 wherein the latch system is shown in a first or locking position.

Referring to FIG. 5, first release 124 is movably supported by latch plate 122 and generally includes a base portion 130, a hook portion 132, and an interface portion 134. Base portion 130 slidably couples first release 124 to latch plate 122 for movement in a fore and aft direction (i.e., longitudinally, front-to-back, etc.). According the particular embodiment illustrated, first release 124 is slidably supported in gap 128. The positioning of first release 124 in gap 128 is intended to prevent contaminants and/or obstructions from interfering with the operation of first release 124.

According to an exemplary embodiment, base portion 130 of first release 124 includes a longitudinal channel (e.g., bore, slot, opening, etc.) for slidably mounting the first release to a shaft 136 that is fixedly coupled to latch plate 122. In such a configuration, first release 124 is configured to move in a fore and aft direction along shaft 136 between the locking position, the sliding position, and the release position. A biasing member 138, shown as a spring, is provided to urge first release 124 towards the locking position. First release 124 further includes a guide pin 140 for engaging a slot 142 in latch plate 122 to guide the first release as the first release moves in the fore and aft direction.

According to an exemplary embodiment, first release 124 is configured to at least partially support the weight of seat assembly 30 when the first release is in the locking position. Referring to FIG. 5, base portion 130 of first release 124 is shaped to contact interface surface 116 of rail member 102 in the locking position to at least partially support the weight of seat assembly 30. As will be explained in greater detail below, the weight of seat assembly 30 is also supported by slider unit 108.

Hook portion 132 of first release 124 extends from base portion 130 and is dimensioned to releasably engage slot 120 of rail member 102. Hook portion 132 is configured to move between the locking position, wherein hook portion 132 is engaged with slot 120, the sliding position, wherein hook portion 132 is disengaged with slot 120 but is still engaged with (e.g., located beneath a portion of, etc.) rail member 102, and the release position, wherein hook portion 132 is sufficiently disengaged from rail member 102 to allow seat assembly to be removed from the rail member. According to the various alternative embodiments, hook portion 132 may be replaced by any structure capable of engaging first release 124 with rail member 102 (e.g., locking pins, tabs, etc.).

Interface portion 134 of first release 124 enables the first release to be selectively moved. According to the particular embodiment illustrated, interface portion 134 is a rack having teeth 144 adapted to engage with the corresponding teeth of drive pinion 126 for converting the circular motion of the drive pinion into rectilinear motion to move first release 124 in the fore and aft direction. As illustrated, teeth 144 may be provided along a top edge of first release 124, or alternatively may be positioned in a variety of other positions.

Referring to FIG. 2, drive pinion 126 is rotationally coupled to latch plate 122 and configured to be in meshing engagement with interface portion 134 of first release 124. According to the particular embodiment illustrated, a pin 146 rotatably supports drive pinion 126 in gap 128. Rotation of drive pinion 126 causes first release 124 to move in the fore and aft direction. As can be appreciated, the motion of first release 124 can be provided be means other than the rack and pinion configuration as shown. For example, in the various alternative embodiments, first release 124 can be moved using variety of devices, including, but not limited to, a cam, a piston, linkage coupled to a rotary mover, etc.

Figure 8:
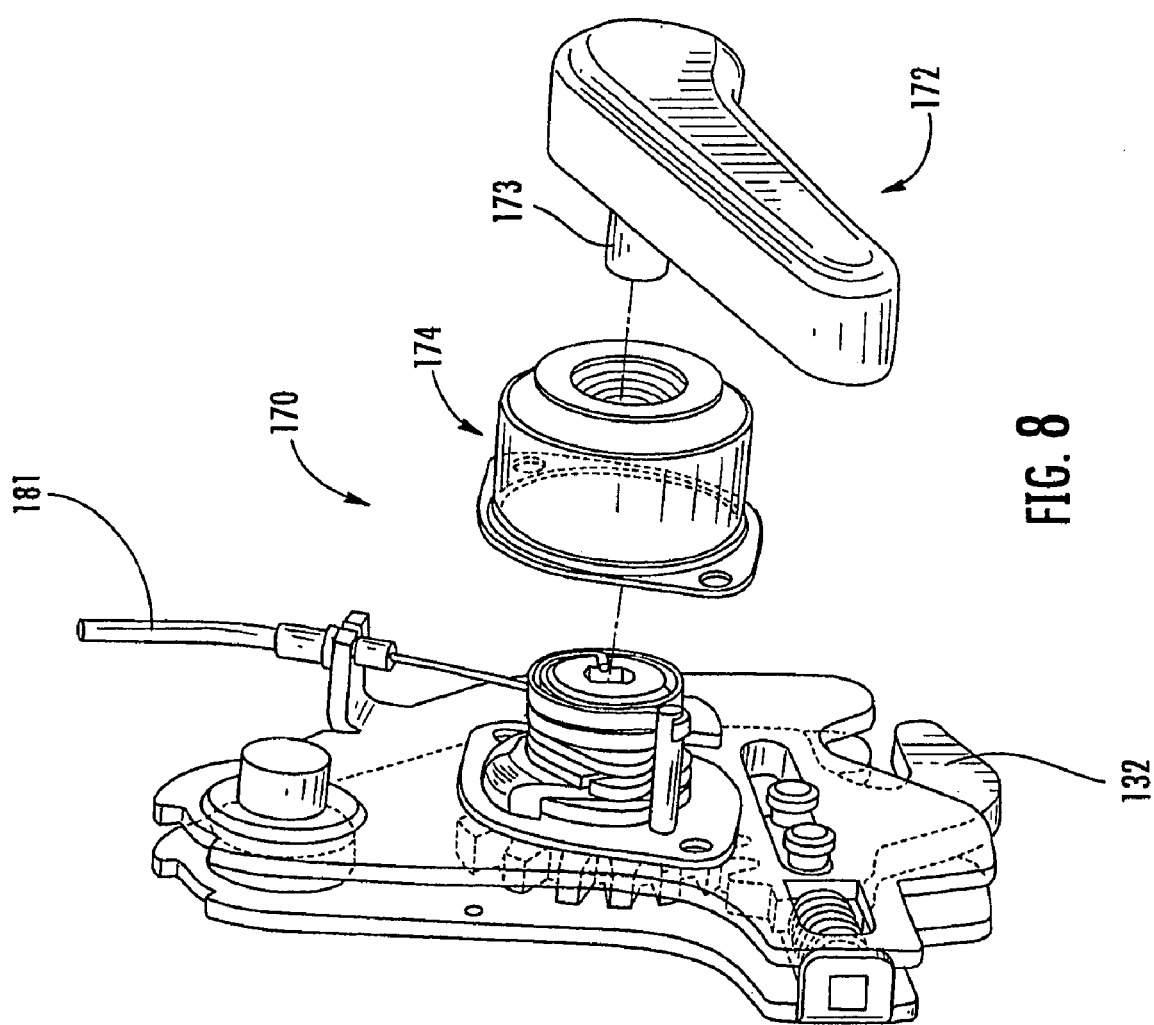
FIG. 8 is a partially exploded, perspective view of the latch system of FIG. 2.

A handle 172 is provided to enable a user to selectively actuate latch system 100 between the locking position (i.e., a normal use position) and the sliding position. Referring to FIG. 8, handle 172 is part of an apparatus 170 that allows a user to move latch system 100 into the sliding position, while preventing a user from moving the latching system beyond the sliding position and into the release position by simply rotating handle 172. Such a configuration is intended to prevent seat assembly 30 from unintentionally disengaging rail member 102 as the seat assembly is being moved along the rail member in a slidable manner.

Referring to FIG. 3, apparatus 170 is shown as being directly coupled one of the outboard and inboard mounting structures 104, 106 and operably coupled to the other of the outboard and inboard mounting structures 104, 106. According to an exemplary embodiment, apparatus 170 is coupled to the rear outboard mounting structure 104 and the corresponding drive pinion 126. A cross tube (e.g., transmission shaft, rod, etc.) shown as a towel bar 150 operably couples apparatus 170 to the rear inboard mounting structure 106 and the corresponding drive pinion 126. In such a configuration, rotation of handle 172 will cause the rotation of the drive pinion 126 on the outboard side and the rotation of the drive pinion 126 on the inboard side. Apparatus 170 is also operably coupled to the front outboard and inboard mounting structures. According to an exemplary embodiment a cable 181 operably couples apparatus 170 to the front outboard and inboard mounting structures.

Figure 9:
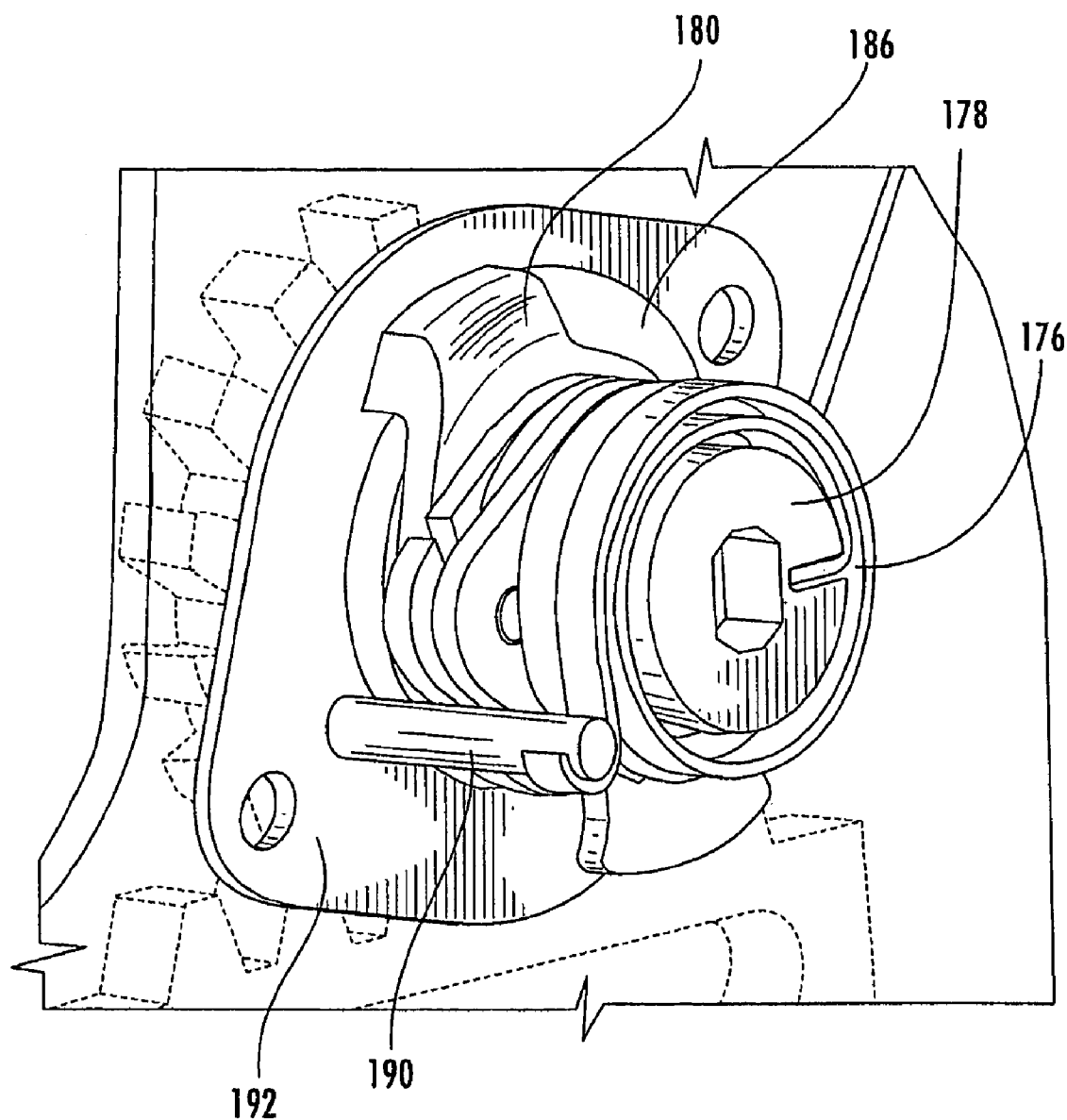
FIG. 9 is a partial, perspective view of the latch system of FIG. 2.
Figure 10:
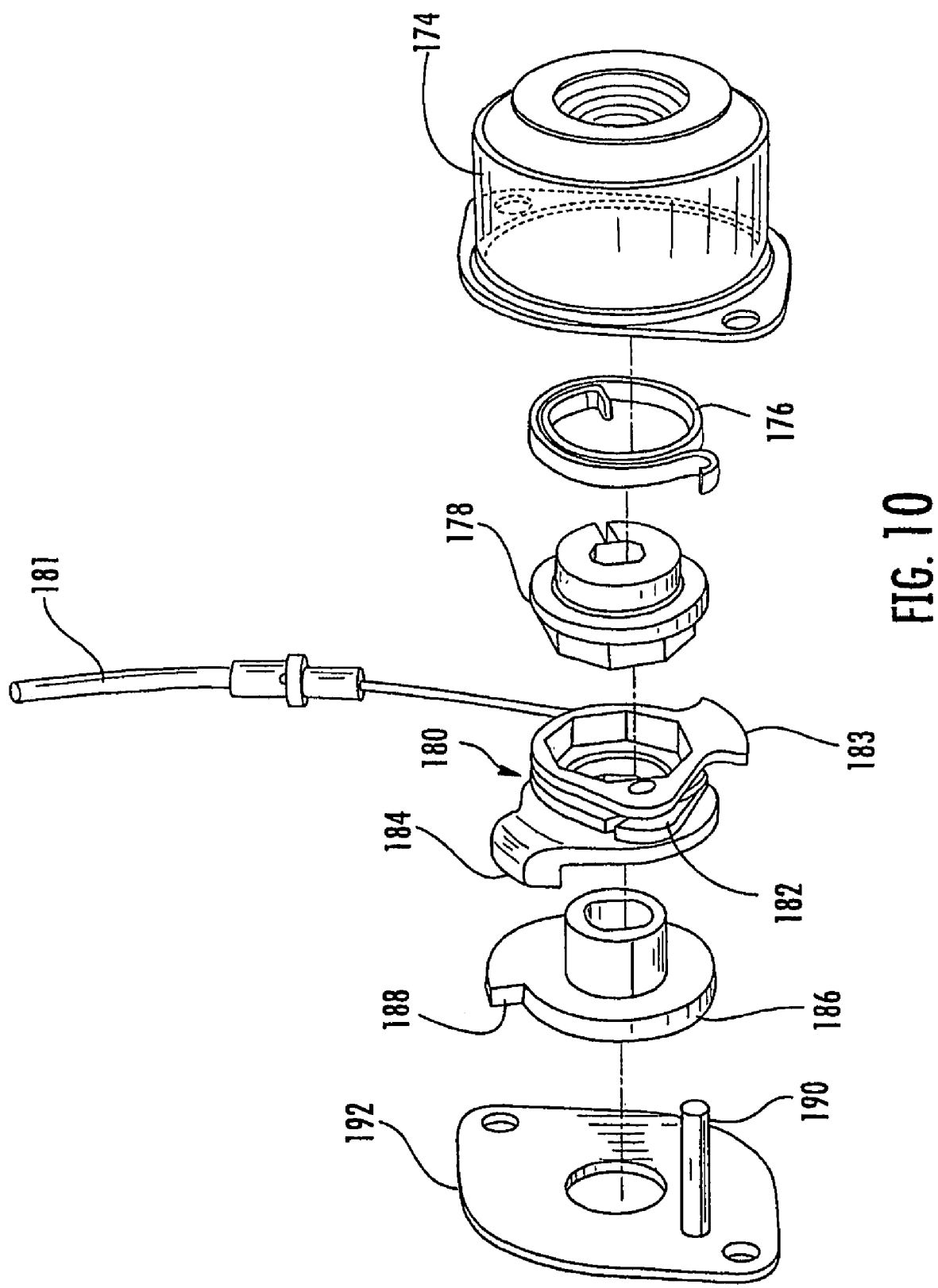
FIG. 10 is an exploded, perspective view of the portion of the latch system illustrated in FIG. 9.

Referring to the embodiment illustrated in FIGS. 8 through 10, apparatus 170 generally includes handle 172, a housing 174, a biasing member 176, a handle nut 178, a core member 180 having a first stop tab 182, a second stop tab 183, and a drive tab 184, a pinion drive plate 186 having a engagement tab 188, a stop pin 190, and a base plate 192. Referring in particular to FIG. 8, base plate 192 is fixedly coupled to rear outboard mounting structure 104 using any of a variety of fastening techniques (e.g., mechanical fasteners, welding, etc.). Stop pin 190 is fixedly coupled relative to base plate 192 and extends outward in a direction that is substantially perpendicular the base plate.

Towel bar 150, or a member operably coupled to towel bar 150, is coupled to drive pinion 126 and extends through an aperture in base plate 192 and engages pinion drive plate 186. Pinion drive plate 186 includes a collar 187 for securely supporting towel bar 150 so that rotation of the towel bar will rotate pinion drive plate 186, and rotation of pinion drive plate 186 will rotate the towel bar. According to an exemplary embodiment, a locking screw (not shown) is inserted through the sidewall of collar 187 to securely hold towel bar 150 relative to drive pinion plate 186.

Drive pinion plate 186 is rotatably supported relative to base plate 192 and includes engagement tab 188 that is configured to engage drive tab 184 of core member 180. Core member 180 is rotatably supported relative to pinion drive plate 186 and is configured to engage engagement tab 188 when handle 172 is moved towards the sliding position. Handle 172 is coupled to handle nut 178 which is in turn coupled to core member 180. According to the particularly embodiment illustrated, handle nut 178 includes an octagonal projection that is received within a corresponding aperture in core member 180. Such a configuration is intended to prevent slippage between the core member and the handle nut when handle 172 is rotated. In alternative embodiments, handle nut 178 may be secured to core member 180 using a number of otherwise suitable configurations (e.g., mechanical fasteners, any of a variety of cross sections, welding, etc.).

A shaft 173 (shown in FIG. 8) couples handle 172 to handle nut 178. Handle 172 is generally biased for rotation in what will hereinafter be referred to as the forward rotational sense by means of biasing member 176. In the particular embodiment illustrated, biasing member 176 is a coil spring having a first end coupled to stop pin 190 and a second end coupled to handle nut 178. Handle 172 can be selectively moved by a user from the locking/forward position backwardly to the sliding position.

To prevent handle 172 from being moved backwardly beyond the sliding position and into the release position, core member 180 further includes first stop tab 182 and second stop tab 183. First and second stop tabs 182, 183 cooperate with stop pin 190 to limit to the rotation movement of handle 172. Referring to FIGS. 9 and 10, biasing member 176 urges handle 172 forwardly towards the locking position until first stop tab 182 engages stop pin 190 thereby limiting the movement of handle 172 in the forward rotational sense. Handle 172 can be moved backwardly towards the sliding position until second stop tab 183 engages stop pin 190 thereby limiting the movement of handle 172 in the backward rotational sense.

As will be detailed below, apparatus 170 allows latch system 100 to be selectively moved into the release position by rotating towel bar 150 backwardly until first release 124 disengages rail member 102 after seat back 38 is moved to a collapsed position. The rotation of towel bar 150 causes the rotation of inboard and outboard drive pinions 126, and the rotation of pinion drive plate 186. As pinion drive plate 186 rotates backwardly, engagement tab 188 is moved away from drive tab 184 of core member 180 thereby allowing the drive pinions to move into the release position without rotating handle 172.

According to an exemplary embodiment, the rotation of a rear towel bar 150 is not communicated to a front towel bar and the corresponding mounting structures coupling seat assembly 30 to the front rail member. Cable 181, as shown in FIG. 10, only communicates the rotation movement of handle 172 to the front towel bar. Seat assembly 30 can be removed by first disengaging rear mounting structures 104, 106 as described above, and then manipulating seat assembly 30 until the front mounting structures disengage the front rail. For example, in one embodiment, a user may need to slightly move the seat assembly in a forward direction once rear mounting structures 104, 106 are disengaged from the rear rail member. According to the various alternative embodiments, the rotational movement of a rear towel bar 150 may be communicated to a front towel bar 150.

To assist in moving seat assembly 30 along rail member 102, sliding unit 108 is provided. Sliding unit 108 is supported relative to outboard mounting structure 104 and inboard mounting structure 106, and is configured to slidably engage interface surface 116 of rail member 106. Sliding unit 108 generally includes a base member 152 and a sliding interface 154. Base member 152 supports sliding interface 154 and according to the particular embodiment illustrated, is configured as a generally U-shaped bracket that is coupled between outboard mounting structure 104 and inboard mounting structure 106.

Figure 4:
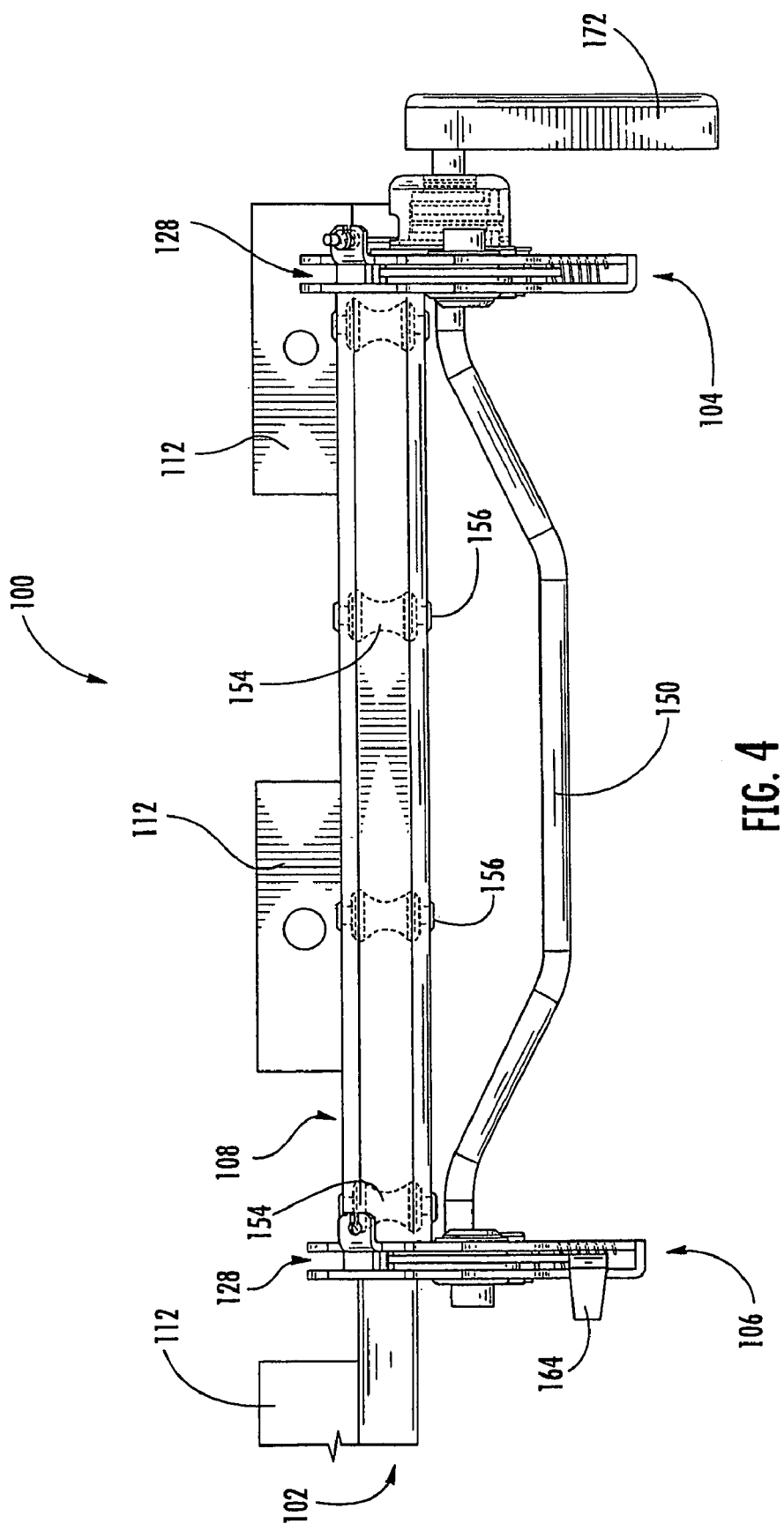
FIG. 4 is a top plan view of the latch system of FIG. 2.

Sliding interface 154 provides a surface that is configured to engage interface surface 116 of rail member 102 in a reciprocatingly slidable relationship, and according to the particular embodiment illustrated, comprises a plurality of rollers supported for rotational movement by pins 156 that are coupled to base member 152. Referring to FIGS. 2 and 4, the rollers may have a shape that substantially corresponds to the shape of interface surface 116. As can be appreciated, any of a variety of known, or otherwise suitable, sliding interfaces may be used to slidably engage rail member 102 (e.g., a material having a relatively low coefficient of friction, bearings, etc.).

In the sliding position, hook portion 132 of first release 124 is disengaged from slot 120 in rail member 102, and base portion 130 of first release 124 is no longer supporting the weight of seat assembly 30. In such a position, sliding unit 108 is configured to support the weight of seat assembly 30. Sliding unit 108 is further configured to support the load of a seat occupant while seat assembly 30 is in the sliding position. This allows a user to remain seated while sliding the seat assembly into an alternative position along rail member 102.

Latch system 100 further includes a second release 160 for preventing first release 124 from moving into the release position when seat assembly 30 is in the locking or sliding position. Second release 160 is pivotally coupled to latch plate 122 at a pivot point 162 and generally includes a lever 164 and a pawl 166. According to a preferred embodiment, second release 160 is pivotally coupled to the latch plate of the rear inboard mounting structure 106. Lever 164, as it pivots, will move pawl 166 through an actuate path in and out of a position where the pawl can engage drive pinion 126 so as to prevent first release 124 from moving into the release position when seat assembly 30 is in the locking or sliding position. Second release 160 further includes a biasing member 168 for urging pawl 166 into engagement with drive pinion 126.

In operation, a user may actuate latch system 100 between the locked position (i.e., the normal use position), the sliding position, and the release position. FIGS. 1 through 5 illustrate latch system 100 in the locked position. In the locked position, hook 132 of first release 124 engages slot 120 of rail member 102. The engagement of hook 132 into slot 120 is intended to securely couple seat assembly 30 to vehicle structure 10. According to a preferred embodiment, hook 132 engages slot 120 in a manner that limits or reduces chuck (i.e., rotation, tilt, etc.) between mounting structures 104, 106 and rail member 102. When in the locked position, the weight of seat assembly 30, and the weight of a seat occupant, is at least partially supported by mounting structures 104, 106 and slider unit 108.

Figure 6:
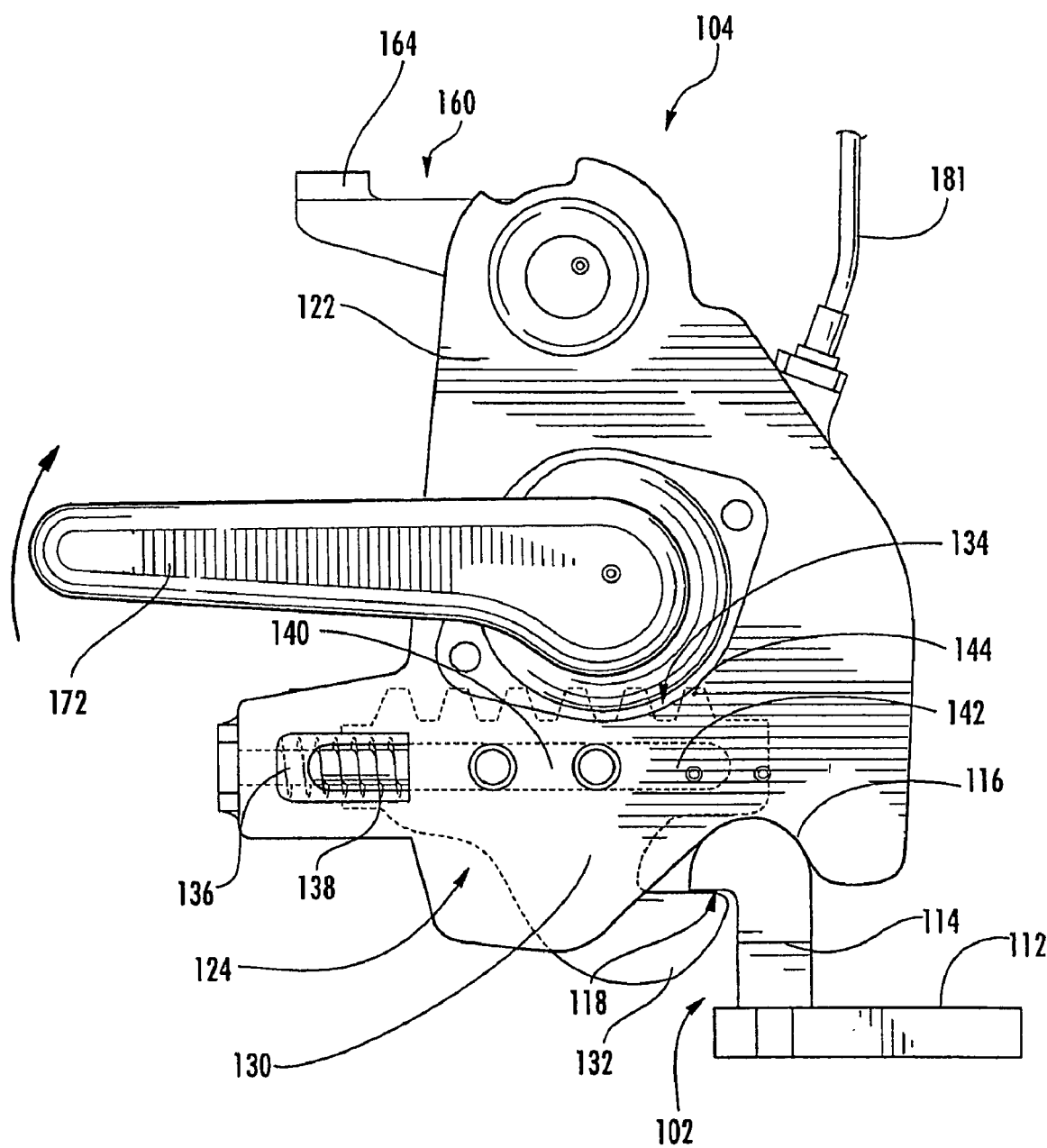
FIG. 6 is a side plan view of the latch system of FIG. 2 wherein the latch system is shown in a second or sliding position.

To slide seat assembly 30 along rail member 102, thereby causing the seat assembly to be repositioned in a lateral direction along rail member 102, latch system 100 is adapted to be selectively moved into the sliding position. Rotation of handle 172 in a rearward direction will rotate outboard side drive pinion 126. Rotation of the outboard side drive pinion 126 will be translated to rotation of towel bar 150 which in turn rotates the inboard side drive pinion 126. Interface surface 134 of first release 124 is in meshing engagement with drive pinion 126 so that when the drive pinion is rotated, hook 132 disengages slot 120. The rotation of handle 172 is limited by stop pin 190 and second stop tab 183 so that when a user fully rotates the handle, hook 132 disengages slot 120 but remains engaged with lip 118 of rail member 102, as shown in FIG. 6. According to the particular embodiment illustrated, lip 118 forms an overhang portion that prevents hook 132 from being disengaged with rail member 102. In the sliding position, the weight of seat assembly is supported by sliding unit 108. As mentioned above, such a configuration allows a user to slide the seat assembly while remaining in a seated position.

Figure 7:
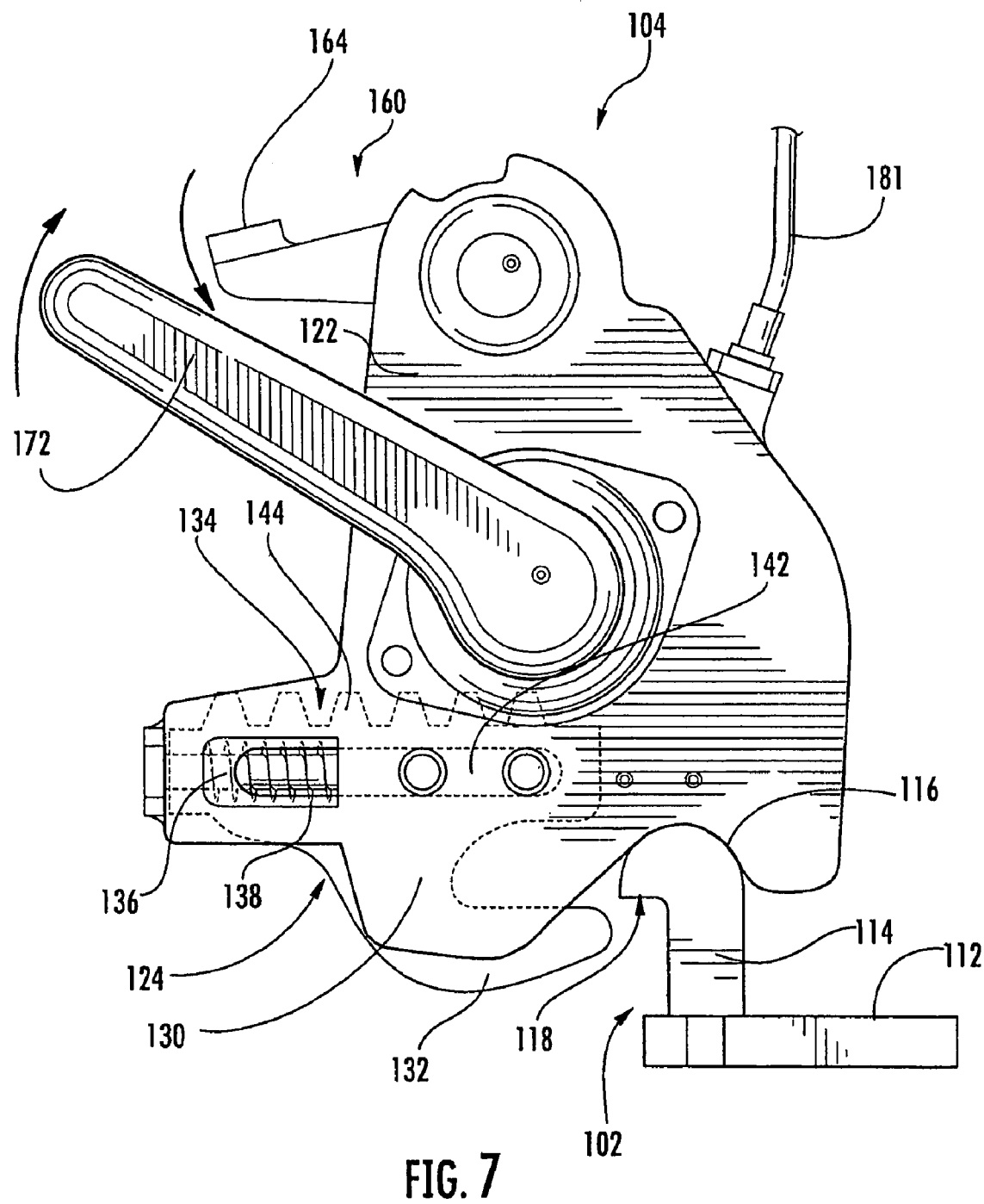
FIG. 7 is a side plan view of the latch system of FIG. 2 wherein the latch system is shown in a third or release position.

To remove seat assembly 30 from vehicle structure 10 and/or to tumble seat assembly 30 to non-seating position and/or a stowed position, latch system 100 is moved into the release position by actuating second release 160. To move latch system 100 into the release position, lever 164 is actuated, for example, by seat back 38 as the seat back pivots or moves forward from the generally upright use position to the generally collapsed non-seating position. As lever 164 pivots forwardly around pivot point 162, pawl 166 is pivoted to a position where pawl 166 is disengaged from inboard side drive pinion 126. Referring to FIG. 7, with pawl 166 disengaged from the inboard side drive pinion, a user may grab and rotate towel bar 150 in a manner that causes hooks 132 to sufficiently disengage rail members 102, including lip 118, so that seat assembly 30 can be removed and/or tumbled. According to various alternative embodiments, handle 172 may be configured to be further rotated once the pawl 166 disengages the drive pinion for moving the system to the third position.

According to a preferred embodiment, while the rotation of handle 172 causes rotation of towel bar 150, the rotation of towel bar 150 does not cause rotation of handle 172. Such a configuration is provided by apparatus 170, and allows a towel bar 150 and both the inboard and outward drive pinions 126 to move independently of handle 172 when a user grabs the towel bar and second release 160 is disengaged from drive pinion 126. Therefore, first release 124 can be moved to the release position which would otherwise be restricted by the rotational parameters of handle 172.

It is important to note that the construction and arrangement of the elements of the latch system as shown in the illustrated embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, or the length or width of the structures and/or members or connectors or other elements of the system may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A latch system for use with a seat to be latched to a guide track, the system comprising:
    a latch plate capable of being coupled to the seat;
    a first release member coupled to the latch plate, the first release member having a base portion and a projection, the projection is configured to releasably engage the guide track and is selectively movable between a first position for fixedly coupling the seat to the guide track, a second position for movably coupling the seat to the guide track, and a third position for detachably coupling the seat to the guide track; and
    a second release member coupled to the latch plate and having a pawl configured to prevent the projection of the first release member from moving to the third position unless the second release member has been selectively actuated.

2. The latch system of claim 1, wherein the projection of the first release member is a hook outwardly extending from the base portion of the first release member.

3. The latch system of claim 2, further comprising a biasing element for urging the hook to the first position.

4. The latch system of claim 2, further comprising a gear rotatably coupled about the latch plate and configured to be in meshing engagement with the base portion of the first release member for moving the hook between the first position, the second position, and the third position.

5. The latch system of claim 4, wherein the pawl of the second release member is configured to releasably engage the gear.

6. The latch system of claim 5, wherein the second release member further comprises a lever, which when actuated, disengages the pawl from the gear and allows the hook to move to the third position.

7. The latch system of claim 6, wherein the lever is capable of being actuated by a backrest of the seat when the backrest is collapsed inward to a non-seating position.

8. The latch system of claim 1, wherein the latch system is designed to be connected to a vehicle seat to allow the vehicle seat to be moved in a cross-car direction when the projection is in the second position.

9. The latch system of claim 1, further comprising a sliding unit coupled to the seat and slidably carried by the guide track for movement along the guide track when the projection is in the second position.

10. The latch system of claim 1, further comprising a handle operatively coupled to the first release member, the handle being actuatable by a user for moving the projection between the first position, the second position and the third position.

11. A seating system for use within a vehicle having a floor structure, the seating system comprising:
a seat including a seat bottom and a backrest;
a guide track configured to be coupled to the floor structure;
a first latch plate coupled to the seat;
a first release member coupled to the first latch plate, the first release member having a base portion and a projection, the projection is configured to releasably engage the guide track and is selectively movable between a first position for fixedly coupling the seat to the guide track, a second position for movably coupling the seat to the guide track, and a third position for detachably coupling the seat to the guide track; and
a second release member coupled to the latch plate and having a pawl configured to engage the first release member to prevent the projection of the first release member from moving to the third position unless the second release member has been selectively actuated.

12. The seating system of claim 11, wherein the guide track comprises a first rail and a second rail spaced parallel from the first rail, the first rail is configured to be disposed substantially beneath a front portion of the seat bottom and the second rail is disposed substantially beneath a rear portion of the seat bottom.

13. The seating system of claim 12, wherein at least one of the first rail and the second rail comprises a projection portion upwardly extending from a base portion.

14. The seating system of claim 13, wherein the projection includes an interface surface and a lip, the seat is configured to slide about the interface surface when the projection of the first release member is in the second position while the projection of the first release member engages the lip to prevent the seat from disengaging the guide track as the seat moves about the interface surface.

15. The seating system of claim 14, wherein the interface surface and the lip are provided on the projection at an end that is distal to the base portion.

16. The seating system of claim 14, further comprising a sliding unit slidably carried by the interface surface of the projection for movement along the guide track when the projection of the first release member is in the second position.

17. The seating system of claim 14, wherein the projection includes at least one aperture configured to receive the projection of the first release member.

18. The seating system of claim 17, wherein the projection of the first release member comprises a hook extending from the base portion for releasably engaging the guide track.

19. The seating system of claim 18, wherein the hook engages the aperture when the first release member is in the first position, is disengaged from the aperture but engages the lip when the first release member is in the second position, and is disengaged from the aperture and the lip when the first release member is in the third position.

20. The seating system of claim 11, wherein the guide track is designed to be connected to the floor structure to allow the seat to be moved in a cross-car direction when the projection of the first release member is in the second position.

* * * * *